United States Patent Office 3,118,889
Patented Jan. 21, 1964

3,118,889
2-CHLOROMETHYL-4,6-DIMETHYL PYRIMIDINES
Hansjuergen A. Schroeder, New Haven, Conn., assignor to Olin Mathieson Chemical Corporation, a corporation of Virginia
No Drawing. Filed July 20, 1962, Ser. No. 211,415
4 Claims. (Cl. 260—251)

This invention relates to chloromethyl-substituted pyrimidine compounds and to a process for preparing them.

2,4,6-trimethyl pyrimidine has been prepared previously by the reaction of 2,4-pentanedione with acetamidine in an alkaline medium. However a satisfactory technique for preparing chloromethyl-pyrimidine compounds was not available until the discovery of the process of this invention.

Chloromethyl-substituted pyrimidine compounds of this invention are suitable for use as chemical intermediates. For example, compounds of this type may be reacted with alkyl phosphites in a Michaelis-Arbusov type reaction to yield the corresponding phosphoro-pyrimidine compounds, which have insecticidal activity. In addition, the trichloromethyl-substituted pyrimidine compounds of this invention may be employed as a starting material in the preparation of dichloromethyl-substituted compounds in the process described in co-pending patent application Serial No. 211,413, filed July 20, 1962, by Ehrenfried H. Kober.

It is the primary object of this invention to provide novel 2-chloromethyl-substituted pyrimidine compounds.

A further object of the invention is to provide a novel process for preparing chloromethyl-substituted pyrimidine compounds.

These and other objects of the invention will be apparent from the following detailed description thereof.

It has now been discovered that chloromethyl-substituted pyrimidine compounds are produced when 2,4-pentanedione is reacted with a chloroalkylamidine in an alkaline medium. Novel compounds produced in accordance with this invention are represented by the formula:

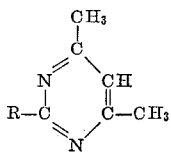

where R is selected from the group consisting of $Cl_3C-$, $Cl_2HC-$, and $ClH_2C-$.

Chloroalkylamidine compounds suitable for reaction with 2,4-pentanedione in the instant novel process include monochloroacetamidine, dichloroacetamidine, trichloroacetamidine and mixtures thereof. In addition the hydrogen chloride salts of these compounds can also be employed. If desired, the corresponding bromine-, fluorine-, and iodine-substituted compounds may also be employed to yield the bromo-, fluoro-, or iodo-substituted methyl pyrimidine compounds, respectively.

The reaction is preferably carried out with equimolar proportions of the 2,4-pentanedione and the chloroalkylamidine. However an excess of either reactant may be employed if desired.

The reaction is carried out in an aqueous alkaline reaction medium. This aqueous alkaline reaction medium may be prepared by dissolving an alkaline substance such as an alkali metal compound in water. Suitable alkali metal compounds include potassium carbonate, sodium carbonate, lithium carbonate, potassium hydroxide, sodium hydroxide, lithium hydroxide, and mixtures thereof.

The volume of aqueous alkaline reaction medium should be sufficient to permit complete or at least partial solution of the organic reactants therein. The volume ratio of aqueous medium to organic reactants is preferably about 10:1 or higher.

The reaction may be carried out at sub-atmospheric, atmospheric, or super-atmospheric pressure. The reaction temperature may be between about 5° C. and about 80° C., and preferably between about 20° C. and about 40° C.

In carrying out the instant novel process the organic reactants are admixed with the aqueous alkaline reaction medium with sufficient agitation to effect a substantially uniform distribution of the organic reactants within the aqueous alkaline reaction medium. The reaction time will vary with the proportion of reactants, the volume ratio of organic phase to aqueous phase, and the degree of agitation, but generally the desired degree of reaction can be obtained in about 4 to about 20 hours. As the reaction progresses, solid chloromethyl-substituted pyrimidine particles form, and precipitate from the aqueous phase. A conventional solid-liquid separation technique, such as filtration, is employed to separate the particles from the liquid after the reaction has progressed for the desired period.

The solid reaction products may be purified by conventional techniques such as recrystallizing and the like.

The following examples are presented to define the invention more fully without any intention of being limited thereby. All parts and percentages are by weight unless otherwise specified.

Example 1

Trichloroacetamidine (95 grams) was admixed with an aqueous solution of potassium carbonate formed by dissolving 75 grams of potassium carbonate in 900 ml. of water. To this solution was added 2,4-pentanedione (56 grams), and agitation was continued for 16 hours while maintaining the reaction at a temperature of about 25° C. The crude solid reaction product was separated from the reaction medium by filtration, and then purified by recrystallizing from ligroin, boiling point 85 to 95° C. A yield of 21 grams of 2-trichloromethyl-4,6-dimethylpyrimidine was obtained. This material had a melting point of 126° C. Chemical analyses of the 2-trichloromethyl-4,6-dimethylpyrimidine product and the theoretical calculated analyses are as follows:

| Element | Theoretical Value, Percent | Analyzed Value, Percent |
|---|---|---|
| Carbon | 37.28 | 36.58 |
| Hydrogen | 3.13 | 3.20 |
| Chlorine | 47.17 | 47.84 |
| Nitrogen | 12.42 | 12.81 |

In order to demonstrate the utility of the novel compounds of this invention, 2-trichloromethyl-4,6-dimethylpyrimidine (54 parts) prepared as described above, was admixed by stirring, with triethylamine (45 parts) and methanethiol (100 parts) at −20° C., in accordance with the process described in the aforementioned Kober patent application. The mixture was allowed to warm up to room temperature and triethylamine hydrochloride produced thereby was removed by filtration. The residue was washed with ether, and the ether, ethylamine, and dimethyldisulfide were then removed by distillation in vacuo. The resulting solid residue was recrystallized from ligroin to yield 32 parts of crystals which were identified as 2-dichloromethyl-4,6-dimethylpyrimidine.

To further demonstrate the utility of the novel compounds of this invention, 2-trichloromethyl-4,6-dimethylpyrimidine prepared as described above was reacted with triethyl phosphite in a Michaelis-Arbusov type reaction to yield a product of 2-bis-diethylphosphono-monochloromethyl-4,6-dimethylpyrimidine containing some 2-diethylphosphono-dichloromethyl-4,6-dimethylpyrimidine.

*Examples II—III*

The procedure for preparing the pyrimidine compound as described in Example I was repeated with the exception that monochloroacetamidine and dichloroacetamidine were employed instead of trichloroacetamidine to yield 2-monochloromethyl-4,6-dimethylpyrimidine and 2-dichloromethyl-4,6-dimethylpyrimidine, respectively. The melting point of the monochloromethyl-substituted pyrimidine was 33° C. and the melting point of the dichloromethyl-substituted pyrimidine was 75° C., after recrystallizing in each instance from ligroin, boiling point 80 to 95° C.

Various modifications of the invention, some of which have been referred to above may be made without departing from the spirit of the invention. Therefore I do not wish to be limited except as defined by the appended claims.

I claim:
1. A compound of the formula:

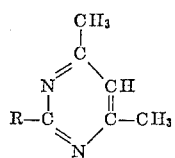

where R is selected from the group consisting of $Cl_3C-$, $Cl_2HC-$, and $ClH_2C-$.
2. 2-monochloromethyl-4,6-dimethylpyrimidine.
3. 2-dichloromethyl-4,6-dimethylpyrimidine.
4. 2-trichloromethyl-4,6-dimethylpyrimidine.

References Cited in the file of this patent
UNITED STATES PATENTS
2,235,638    Hromatka _____ Mar. 18, 1941
OTHER REFERENCES
Basterfield: Canadian J. Research, vol. 1 (1929), pages 285–91, Q 1 C6.
Bowman: J. Chem. Soc. (1937), pp. 494–5, QD 1 C6.